United States Patent
Chong et al.

(10) Patent No.: US 8,526,532 B2
(45) Date of Patent: Sep. 3, 2013

(54) TRANSMITTER WITH DYNAMIC EQUALIZER

(75) Inventors: Kian Haur Chong, McKinney, TX (US); Nirmal Warke, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 468 days.

(21) Appl. No.: 13/017,959

(22) Filed: Jan. 31, 2011

(65) Prior Publication Data

US 2012/0195359 A1 Aug. 2, 2012

(51) Int. Cl.
*H04L 25/03* (2006.01)
*H03K 5/159* (2006.01)

(52) U.S. Cl.
USPC .................................... 375/296; 375/232

(58) Field of Classification Search
USPC ............... 375/229, 230, 232, 259, 285, 295, 375/296, E7.202; 341/59; 333/18, 28 R
See application file for complete search history.

(56) References Cited

U.S. PATENT DOCUMENTS

| | | | |
|---|---|---|---|
| 6,483,872 B2* | 11/2002 | Nguyen | 375/231 |
| 6,665,308 B1* | 12/2003 | Rakib et al. | 370/441 |
| 6,714,587 B1* | 3/2004 | Van Houtum et al. | 375/220 |
| 6,944,804 B1* | 9/2005 | Kim et al. | 714/704 |
| 2006/0291553 A1* | 12/2006 | Nemer | 375/233 |
| 2007/0097847 A1* | 5/2007 | Ando et al. | 369/275.4 |
| 2009/0304054 A1* | 12/2009 | Tonietto et al. | 375/221 |
| 2012/0236923 A1* | 9/2012 | Xu | 375/232 |

* cited by examiner

*Primary Examiner* — Tesfaldet Bocure
(74) *Attorney, Agent, or Firm* — Lawrence J. Bassuk; W. James Brady; Frederick J. Telecky, Jr.

(57) ABSTRACT

A method for filtering a signal having a series of symbols to be transmitted using the default coefficients, detecting occurrence of a series of consecutive common symbols followed by a different symbol in the series of symbols and based on detecting the occurrence, changing from the default coefficients to a second set of coefficients.

21 Claims, 3 Drawing Sheets

TRANSMITTER WITH DYNAMIC EQUALIZER

BACKGROUND

In a transmission system, a transmitter transmits signals across a transmission medium (e.g., wire, trace on a circuit board, etc.) to a receiver. The transmitter encodes the data to be transmitted and transmits the encoded signals across the transmission medium. A receiver receives the transmitted signals, decodes the signals to retrieve the original data.

The receiver should accurately retrieve the data being transmitted. That is, if a logic "1" is transmitted, the receiver should recognize the signal as encoding a 1. If the bit to be transmitted is a 0, the receiver should recognize the signal as encoding a 1. Due to a variety of factors such as interference from external sources, cross-talk within the transmission system, etc., a receiver may not always decode the received signal accurately. That is, a logic 1 being sent by a transmitter may be determined to be a logic 0 by the receiver, and vice versa. Receiving and decoding the transmitted bits incorrectly may force the transmitter to resend the data, which unfortunately slows down system performance. Further, if the receiver does not determine that a bit was received in error, the transmitter will not know to resend the data and the system may simply operate incorrectly.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct electrical connection. Thus, if a first device couples to a second device, that connection may be through a direct electrical connection, or through an indirect electrical connection via other devices and connections.

The terms "coefficient" and "weight" are synonymous.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
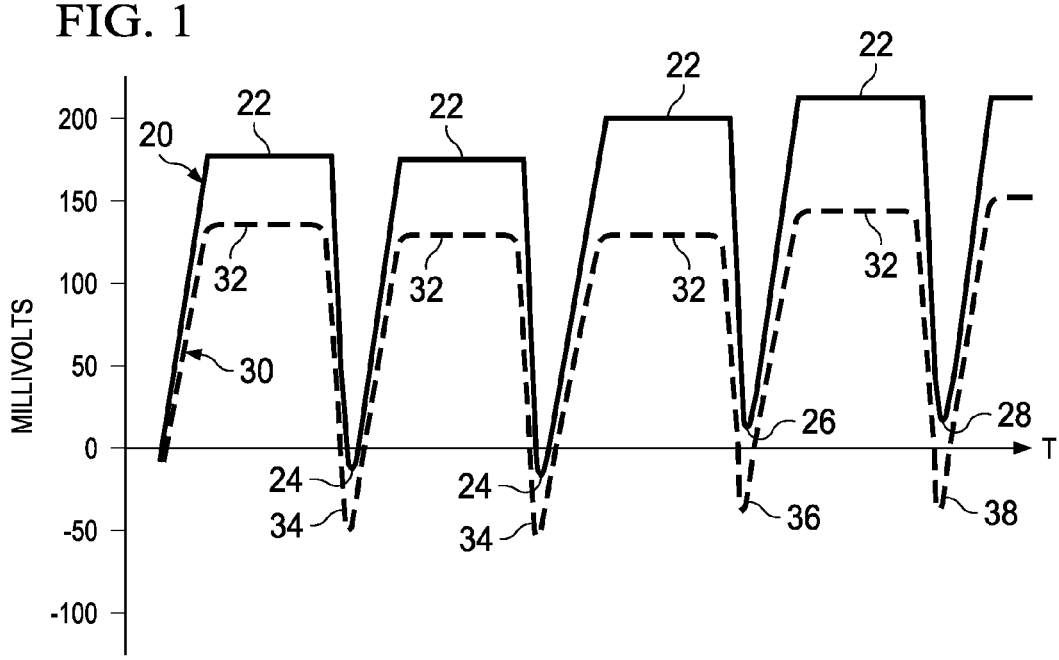
FIG. 1 illustrates two examples of signal transmission in a transmission system.

FIG. 1 illustrates two transmission sequences 20 and 30. Each transmission sequence represents the transmitted voltage by a transmitter across a transmission medium. The illustrative vertical axis represents transmission voltage in millivolts (mv) ad the horizontal axis represents time (T). The transmitter that transmitted sequence 20 is configured differently than the sequence that transmitted sequence 30. The difference is the coefficients used in the finite impulse response (FIR) which comprises an equalizer implemented in the transmitter.

The peaks 22 for sequence 20 represent a series of common symbols (i.e., symbols that are all the same). For example, each peak 22 may comprise 10 consecutive symbols of the same level. The dip 24 between each peak 22 represents a single different symbol. Thus, FIG. 1 illustrates a series of common, consecutive symbols followed by a single different symbol followed again by a series of common consecutive symbols and so on. That is, sequence 20 depicts a single symbol interspersed between transmission of a long sequence of common symbols. A receiver receives the transmitted symbols and sets its slicer at a threshold of, for example, 0 volts. A received voltage over 0 V is determined to be one symbol (e.g., a 1), while a received voltage less than 0 V is determined to be a different symbol (e.g., a -1). For the exemplary sequence 20, two of the dips 24 drop below 0 V and thus would be interpreted as the correct symbol. Dips 26 and 28, however, do not quite drop below 0 V and thus would be incorrectly interpreted. This error is caused by inter-symbol interference.

FIG. 1 also shows a transmission sequence 30. Sequence 30 has a similar shape to sequence 20 but lower peaks 32 and dips 34, 36, and 38 that are lower than the corresponding dips of sequence 20. Like sequence 20, sequence also comprises the transmission of a long series of common symbols (illustrated by peaks 32) followed a single different symbol at the dips. The difference between sequences 20 and 30 is that for sequence 30, the coefficients used in the transmitter's FIR filter are different than the coefficients used when transmitting sequence 20. For sequence 30, the coefficients comprise a post cursor coefficient that is greater than the post cursor coefficient used for sequence 20. As a result, the dips 34, 36, and 38 for sequence 30 are lower and all dips are less than 0 V. Consequently, all single symbols corresponding to the dips are correctly interpreted. As a result of the difference in coefficients, the peaks 32 for sequence 30 also are lower than the corresponding peaks for sequence 20. This means that sequence 30 may have a smaller "eye" height than for sequence 20. Thus, the single symbols at the dips are more likely to be correctly detected and interpreted at the expense of an overall lower smaller eye-height.

Figure 2:
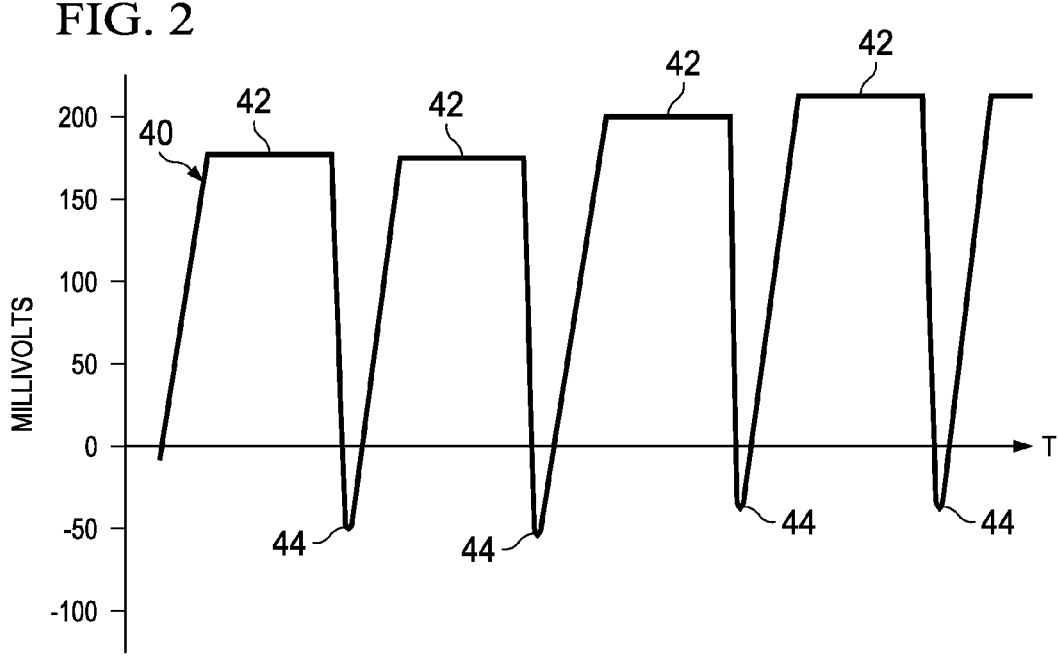
FIG. 2 a system in accordance with a preferred embodiment.

The preferred embodiments of the invention involves, as will be explained below, a transmitter having a dynamic equalizer in which the filter coefficients are dynamically varied. FIG. 2 shows a transmission sequence 40 in which the filter coefficients are varied. How the coefficients are varied will be explained below. In short, the coefficients are changed from a default setting to a second setting upon detection of a single symbol following a long series of common consecutive symbols. The change in coefficients may be just for the one different symbol in some embodiments, or more than just that one symbol in other embodiments. The coefficients then revert back to the default setting for the next ensuing long series of common consecutive symbols. The benefit of dynamically varying the filter coefficients is depicted in FIG. 2. As shown, the peaks 42 of sequence 40 correspond in amplitude to the peaks of sequence 20, while the dips 44 correspond to the dips 34, 36, and 38 of sequence 30. The peaks are maintained at the higher level of sequence 20 and the dips at the lower level of sequence 30 thereby ensuring that the single symbols are correctly received and interpreted.

Figure 3:
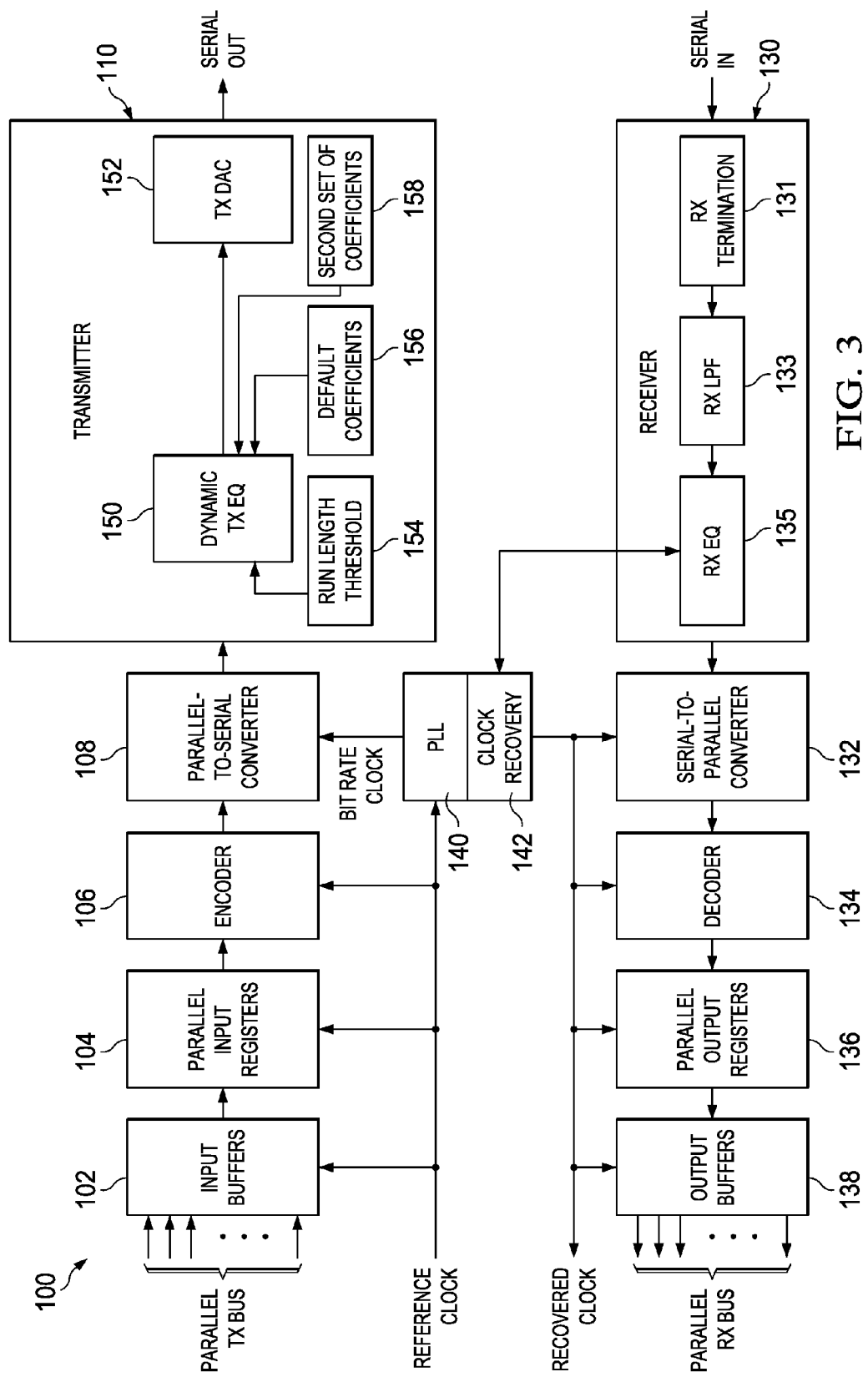
FIG. 3 illustrates a signal transmission sequence using the system of FIG. 2.

The dynamic equalizer mentioned above can be part of any type of transmitter for which equalization is desirable. One such transmitter type is a serializer/deserializer (SERDES) such as that shown in FIG. 3. FIG. 3 shows a block diagram of a SERDES transceiver 100 in accordance with the preferred embodiments of the invention. As shown, transceiver 100 receives parallel data from a parallel transmit (TX) bus and converts the parallel data to serial (serial out). The transceiver 100 also receives serial data (serial in) and converts the received serial data to parallel and places the parallel data on a parallel RX bus.

More specifically, the transceiver 100 receives the parallel TX bus data into input buffers 102 and from there into parallel input registers 104. An encoder 106 (e.g., 8B/10B) 106 encodes the parallel data which is then converted to serial data by a parallel-to-serial converter 108. The serial data stream is then provided to a transmitter 110 which comprises a dynamic TX equalizer 150 coupled to a TX digital-to-analog converter (DAC) 152. The DAC 152 transmits the serial data on a serial transmission medium such as a wire, printed circuit board (PCB) trace, etc.

The transceiver 100 also receives in coming serial stream into a receiver (RX) termination 131 in a receiver 130. The RX termination ensures satisfactory impedance matching for the transmissions. The receiver also includes an RX low pass filter (LPF) filter out higher frequency noise. The receiver also includes an RX equalizer 135 that balances the energy in all of the operating frequency range.

From the RX EQ 135, the transceiver converts the serial data to parallel by a serial-to-parallel converter 132. The parallel data is then decoded by decoder 134 (e.g., 10B/8B decoder) and stored in parallel output registers 136 pending their transmission on the parallel RX bus via output buffers 138.

A reference clock is also provided to the transceiver 100 to control the timing of the receipt of the incoming parallel bits and conversion to a serial format. A phase-locked loop (PLL) 140 receives the reference clock and produces a higher frequency bit rate clock to control the timing of the parallel-to-serial converter 108 and drive the output serial bits at a faster rate than the incoming parallel bits.

A clock recovery circuit 142 generates a recovered clock from the incoming serial data and uses the recovered clock to control the serial-to-parallel converter 132, the decoder 134, the parallel output registers 136, and the output buffers 138. The combined efforts of the PLL 140 and clock recovery circuit 142 ensure proper timing of the incoming parallel and serial data as well as their conversion to serial and parallel formats, respectively.

The dynamic TX equalizer 150 comprises an FIR filter that implements variable (i.e., not static) filter coefficients. In accordance with some embodiments, the FIR filter implements two sets of filter coefficients—a set of default coefficients 156 and a second set of coefficients 158 which have different values than the default coefficients 156. The default and second set of coefficients 156, 158 may be stored in memory in the transmitter 110 and accessible to the dynamic TX equalizer 150, or otherwise stored in the equalizer 150 itself.

The transmitter 110 also stores a run length threshold value 154. This value is preset or programmable. The run length threshold value 154 represents the number of consecutive common symbols that must be detected, followed by a single different symbol, to cause a change from the default coefficients 156 to the second set of coefficients 158. For example, if the run length threshold value is 7 then, upon detecting 7 consecutive common symbols followed by a single different symbol (e.g., 7 consecutive instances of a +1 symbol followed by a single −1 symbol followed by one or more +1 symbols), the dynamic TX equalizer 150 automatically changes its coefficients from the default coefficients 156 to the second set of coefficients 158.

Figure 4:
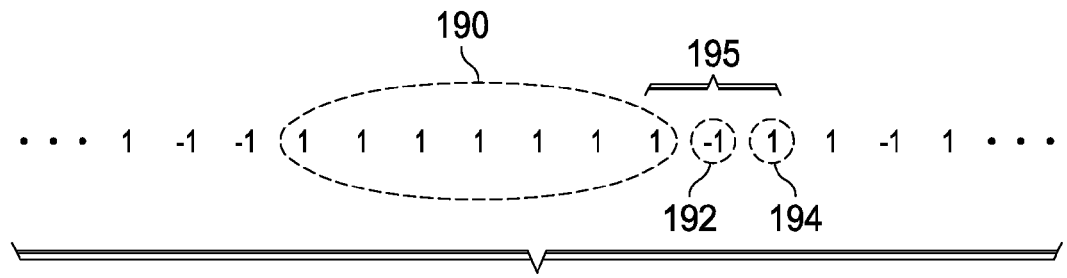
FIG. 4 shows an example of a series of symbols which would prompt a dynamic change in filter coefficients in accordance with preferred embodiments of the invention.

FIG. 4 illustrates a sequence of symbols. Reference numeral 190 denotes the occurrence of series of consecutive symbols all having the same value (1 in this example). The next symbol is different and is a −1 (designated by reference numeral 192). The next symbol after that is 1 (designated by reference numeral 194). Thus, the dynamic TX equalizer 150 detects the occurrence of the 7 consecutive 1's followed by a single occurrence of a −1 and, as a result, changes the filter coefficients.

In some embodiments, the coefficients are changed so as to emphasize the current symbol less and emphasize the previous symbol more. For example, the default coefficients 156 may comprise a weight of 10% for the previous symbol and a weight of 90% for the current symbol, and upon changing the coefficients, the previous symbol's weighting may increase to 15% and the current symbol's weighting may be reduced to 85%. In yet other embodiments, the change in coefficients may entail an increase in the current symbol's weighting and a decrease in the previous symbol's weighting. The post cursor coefficient thus may be increased or decreased when changing from the default coefficients 156 to the second set of coefficients 158.

In some embodiments, the change to the second set of coefficients 158 is just for the one different symbol (−1 in the example above), then the coefficients change back to the default coefficients 156 for the next symbol. Referring again to FIG. 4, the default coefficients would be used for all of the symbols other than the single symbol at 192. For the symbol at 192, the second set of symbols 158 would be used.

In other embodiments, the change from the default coefficients 156 to the second set of coefficients 158 occurs one symbol prior to the different symbol and the second set of coefficients 158 remains in place for that symbol and the next two symbols (i.e., the different symbol and the symbol after that). With reference to the example of FIG. 4, the default coefficients 156 would be used for all symbols other than the symbols denoted by reference numeral 195; for the symbols at 195, the second set of coefficients are used by the dynamic TX equalizer 150.

In some embodiments, the dynamic TX equalizer 150 looks for a threshold sequence of common symbols followed by a single different symbol followed by the previous symbol value to determine when to change the filter coefficients. In other embodiments, the dynamic TX equalizer 150 looks for a threshold sequence of common symbols followed by two (or more in other embodiments) identical symbols yet different from the previous threshold series of common symbols and followed by the previous symbol value to determine when to change the filter coefficients.

Figure 5:
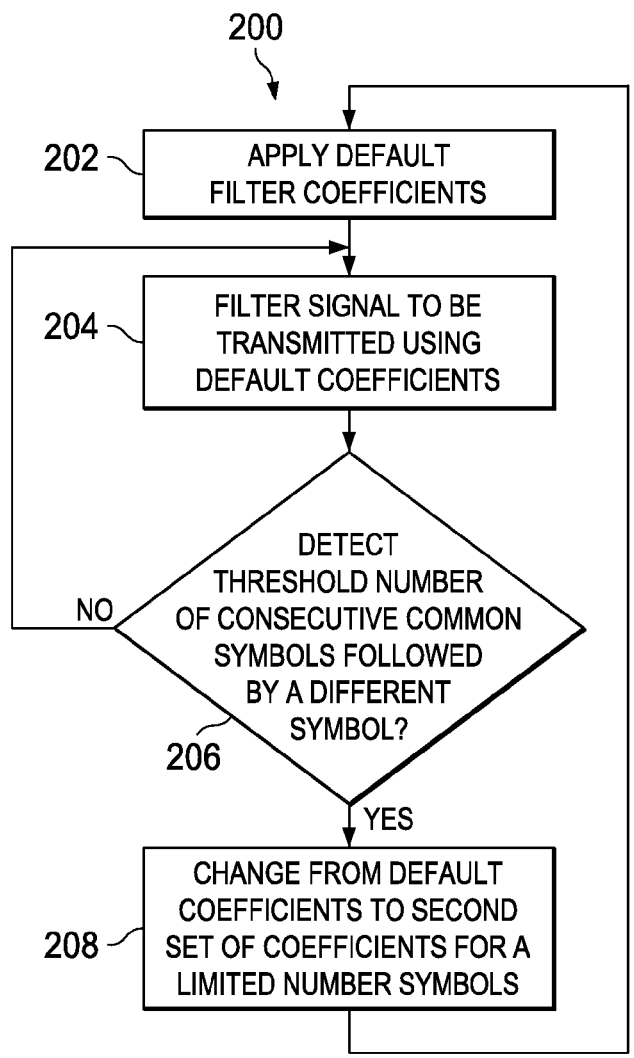
FIG. 5 provides a flowchart illustrating a method in accordance with a preferred embodiment of the invention.

FIG. 5 shows a method 200 in accordance with various embodiments. The actions shown in FIG. 5 may be performed in the order shown or in a different order as desired. Further, the actions may be performed serially, or two or more of the actions may be performed in parallel. In accordance with at least some embodiments, the transmitter 110 (e.g., the dynamic TX equalizer 150) performs the actions of FIG. 5.

At 202, the method comprises applying the default filter coefficients 156 and then filtering the signal to be transmitted using the default coefficients (204). Decision 206 detects the occurrence of a threshold number of consecutive common symbols followed by a different symbol. If the condition for changing the filter coefficients has not been detected, then control loops back to 204 and the dynamic TX equalizer continues operating using the default coefficients 156.

If, however, the condition for changing the filter coefficients has been detected, then at 208, the dynamic TX equalizer 150 automatically changes operation from the default coefficients 156 to the second set of coefficients 158 for a limited number of symbols. As explained above, the limited number may be 1 meaning the second set of coefficients are used just for the symbol immediately following the threshold series of consecutive common symbols. In yet other embodiments, the limited number may be 3 meaning the second set of coefficients are used just for the last symbol in the sequence of consecutive common symbols as well as the next two symbols thereafter.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
applying default coefficients to a transmit filter;
filtering a signal to be transmitted using the default coefficients, said signal comprising a series of symbols;
detecting occurrence of a series of consecutive common symbols followed by a different symbol; and
based on detecting said occurrence, changing from the default coefficients to a second set of coefficients.

2. The method of claim 1 further comprising changing back to the default coefficients following transmission of the different symbol.

3. The method of claim 1 further comprising changing back to the default coefficients following transmission of a symbol immediately following the different symbol.

4. The method of claim 1 wherein changing from the default coefficients to the second set of coefficients occurs for transmission of the last symbol in the series of consecutive common symbols that precede the different symbol.

5. The method of claim 1 wherein changing from the default coefficients to the second set of coefficients occurs for the last symbol in the series of consecutive common symbols that precede the different symbol with the default coefficients remaining in place for the subsequent two symbols, and the method further comprising changing back to the default coefficients after said subsequent two symbols.

6. The method of claim 1 wherein changing from the default coefficients to the second set of coefficients comprises increasing the coefficient for a post cursor symbol from the post cursor symbol's value in the default coefficients.

7. The method of claim 1 wherein changing from the default coefficients to the second set of coefficients comprises decreasing the coefficient for a post cursor symbol from the post cursor symbol's value in the default coefficients.

8. A transmitter, comprising:
a dynamic equalizer; and
a digital-to-analog converter coupled to said dynamic equalizer;
wherein said dynamic equalizer is configured to implement a set of default coefficients and then change to a second set of coefficients upon detection of a series of consecutive common symbols followed by a different symbol.

9. The transmitter of claim 8 wherein the dynamic equalizer is configured to change the coefficients back from the second set of coefficients to the default coefficients following transmission of the different symbol.

10. The transmitter of claim 8 wherein the dynamic equalizer is configured to change the coefficients back from the second set of coefficients to the default coefficients following transmission of a symbol immediately following the different symbol.

11. The transmitter of claim 8 wherein the dynamic equalizer is configured to change from the default coefficients to the second set of coefficients for the last symbol in the series of consecutive common symbols that precede the different symbol.

12. The transmitter of claim 8 wherein the dynamic equalizer is configured to change from the default coefficients to the second set of coefficients by increasing the coefficient for a post cursor symbol.

13. The transmitter of claim 8 wherein the dynamic equalizer is configured to change from the default coefficients to the second set of coefficients by decreasing the coefficient for a post cursor symbol.

14. The transmitter of claim 8 wherein the dynamic equalizer is configured to change from the default coefficients to the second set of coefficients for the last symbol in the series of consecutive common symbols that precede the different symbol with the default coefficients remaining in place for the subsequent two symbols and the dynamic equalizer reverts back to the default coefficients after said subsequent two symbols.

15. A serializer/deserializer, comprising:
a parallel-to-serial converter; and
a transmitter coupled to the parallel-to-serial converter, said transmitter configured to implement a set of default filter coefficients and then change to a second set of filter coefficients upon detection of a series of consecutive common symbols followed by a different symbol.

16. The serializer/deserializer of claim 15 wherein the transmitter is configured to change the coefficients back from the second set of coefficients to the default coefficients following transmission of the different symbol.

17. The serializer/deserializer of claim 15 wherein the transmitter is configured to change the coefficients back from the second set of coefficients to the default coefficients following transmission of a symbol immediately following the different symbol.

18. The serializer/deserializer of claim 15 wherein the transmitter is configured to change from the default coefficients to the second set of coefficients for the last symbol in the series of consecutive common symbols that precede the different symbol.

19. The serializer/deserializer of claim 15 wherein the transmitter is configured to change from the default coefficients to the second set of coefficients by increasing the coefficient for a post cursor symbol.

20. The serializer/deserializer of claim 15 wherein the transmitter is configured to change from the default coefficients to the second set of coefficients by decreasing the coefficient for a post cursor symbol.

21. The serializer/deserializer of claim 15 wherein the transmitter is configured to change from the default coefficients to the second set of coefficients for the last symbol in the series of consecutive common symbols that precede the different symbol with the default coefficients remaining in place for the subsequent two symbols and the transmitter reverts back to the default coefficients after said subsequent two symbols.

* * * * *